United States Patent
Kim et al.

(10) Patent No.: US 8,203,640 B2
(45) Date of Patent: Jun. 19, 2012

(54) PORTABLE TERMINAL HAVING TOUCH SENSING BASED IMAGE CAPTURE FUNCTION AND IMAGE CAPTURE METHOD THEREFOR

(75) Inventors: Jong-Hwan Kim, Gyeonggi-Do (KR); Kwang-Ho Eom, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 543 days.

(21) Appl. No.: 12/172,076

(22) Filed: Jul. 11, 2008

(65) Prior Publication Data

US 2009/0015703 A1    Jan. 15, 2009

(30) Foreign Application Priority Data

Jul. 11, 2007    (KR) .................. 10-2007-0069817

(51) Int. Cl.
*H04N 5/222* (2006.01)
*G06F 3/041* (2006.01)

(52) U.S. Cl. .................. 348/333.12; 345/173

(58) Field of Classification Search ............ 348/333.12, 348/333.11, 333.07, 333.05, 333.02, 14.07; 345/173

See application file for complete search history.

(56) References Cited

U.S. PATENT DOCUMENTS

| | | | |
|---|---|---|---|
| 5,923,908 A * | 7/1999 | Schrock et al. ............... | 396/85 |
| 6,778,217 B1 * | 8/2004 | Nishimura ............... | 348/333.12 |
| 6,919,927 B1 * | 7/2005 | Hyodo ................... | 348/333.02 |
| 7,034,881 B1 * | 4/2006 | Hyodo et al. ............ | 348/333.12 |
| 7,649,562 B2 * | 1/2010 | Misawa et al. ........... | 348/333.01 |
| 2005/0012723 A1 * | 1/2005 | Pallakoff .................... | 345/173 |
| 2007/0013672 A1 * | 1/2007 | Shim et al. .................. | 345/173 |
| 2008/0001927 A1 * | 1/2008 | Yoshida ..................... | 345/173 |
| 2008/0002963 A1 * | 1/2008 | Chuang et al. ............ | 396/310 |

* cited by examiner

*Primary Examiner* — Trung Diep
(74) *Attorney, Agent, or Firm* — Lee, Hong, Degerman, Kang & Waimey

(57) ABSTRACT

Disclosed is a portable terminal having a touch sensing based image capture function and image capture method therefore, the method including: displaying a preview image of an object to be captured on a touch screen; recognizing (sensing) a touch input for the preview image; setting an image capture function based on the recognized touch input; and automatically performing an image capture operation according to the set capture function. The image capture function includes setting and change for a focus area, exposure, illumination, lightness, zoom-in/zoom-out and color change. Therefore, the present invention can enable the user to freely set the focus area and to perform a single or continuous image capture operation with a simple touch, thereby being utilized in all portable devices employing the touch screen.

22 Claims, 8 Drawing Sheets

PORTABLE TERMINAL HAVING TOUCH SENSING BASED IMAGE CAPTURE FUNCTION AND IMAGE CAPTURE METHOD THEREFOR

RELATED APPLICATION

Pursuant to 35 U.S.C. §119(a), this application claims the benefit of earlier filing date and right of priority to Korean Application No. 10-,2007-0069817, filed on Jul. 11, 2007, the contents of which is hereby incorporated by reference in its entirety.

BACKGROUND OF THE INVENTION

1. Field of the Invention

The present invention relates to a portable terminal having a touch sensing based image capture function and an image capture method therefore.

2. Description of the Related Art

A portable terminal may be configured to perform a variety of functions. Examples of such functions may include data/voice communications, capturing images or videos via a camera, recording audio, playing music files via a speaker system, and displaying images or videos. Some terminals have been equipped with additional functionality that supports game playing, while other terminals have been implemented as an integrated multimedia player. More recently, the portable terminal has been equipped with a function of receiving broadcasts or multicast signals, thereby enabling a user to watch videos or television programs.

Among the various functions of the portable terminal, the function of capturing images or videos via a camera refers to a function that allows a user to capture videos or still images by using a camera provided in a portable terminal. In order to perform an image capture operation using the camera function, the user should change a terminal's mode into a camera mode through a key manipulation and then select an appropriate image capturing mode among corresponding camera menus.

Once an image-capturing mode is selected, a preview screen display is displayed on a screen display. The user adjusts a direction of the portable terminal and its capture angle while checking an object to be taken (e.g., person, scenery, objects, etc.) on the preview screen display by using a zoom-function, and the like. After the size of an image to be captured and the capture angle are adjusted, the user presses a capture button, thereby automatically focusing via an Auto Focus (AF) function, thus to perform the image capture operation.

Various attempts have been made to easily and conveniently implement complicated functions in such portable terminals by means of hardware or software. For instance, a display unit is, for a user's convenience, implemented as a touch screen, a portion of a keypad is provided with a touch pad, or a user interface environment is provided in a portable terminal to enable a user to conveniently search for or select among available functions.

Accordingly, there is a need to develop a variety of tools that conform to the new attempts by means of hardware or software.

SUMMARY OF THE INVENTION

Therefore, an object of the present invention is to provide a portable terminal that can automatically perform a touch sensing based image capture operation.

Another object of the present invention is to provide an image capture method for a portable terminal that can set and execute a variety of capture functions according to a touch input.

To achieve these and other advantages and in accordance with the purpose of the present invention, as embodied and broadly described herein, there is provided a touch sensing based image capture method according to the present invention, including: displaying a preview image of an object to be captured on a touch screen; recognizing a touch input for the preview image; setting an image capture function based on the recognized touch input; and automatically performing an image capture operation according to the set capture function.

To achieve these and other advantages and in accordance with the purpose of the present invention, as embodied and broadly described herein, there is provided a portable terminal, including: a touch screen for displaying a preview image of an object to be captured; and a controller for displaying an image capture function based on a touched position, when a touch for the displayed preview image is inputted, and performing an image capture operation according to the corresponding capture function.

The image capture function may include a setting, change and execution for a focus area, exposure, illumination, lightness, zoom-in/zoom-out, and color change.

The touch input can be one of a short touch, a long touch, a multi-position touch, and a touch & drag.

The focus area is configured to set by a touch and to delete by a double-touch.

The focus area is set in the form of dots or closed curves, and can be moved or changed by dragging. In addition, the set focus area is visually displayed on the preview screen display or audibly outputted.

If one or more displayed focus areas are provided, a continuous image capture operation is performed according to the number of selected focus areas.

The foregoing and other objects, features, aspects and advantages of the present invention will become more apparent from the following detailed description of the present invention when taken in conjunction with the accompanying drawings.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

In the drawings.

DETAILED DESCRIPTION OF THE INVENTION

Figure 1:
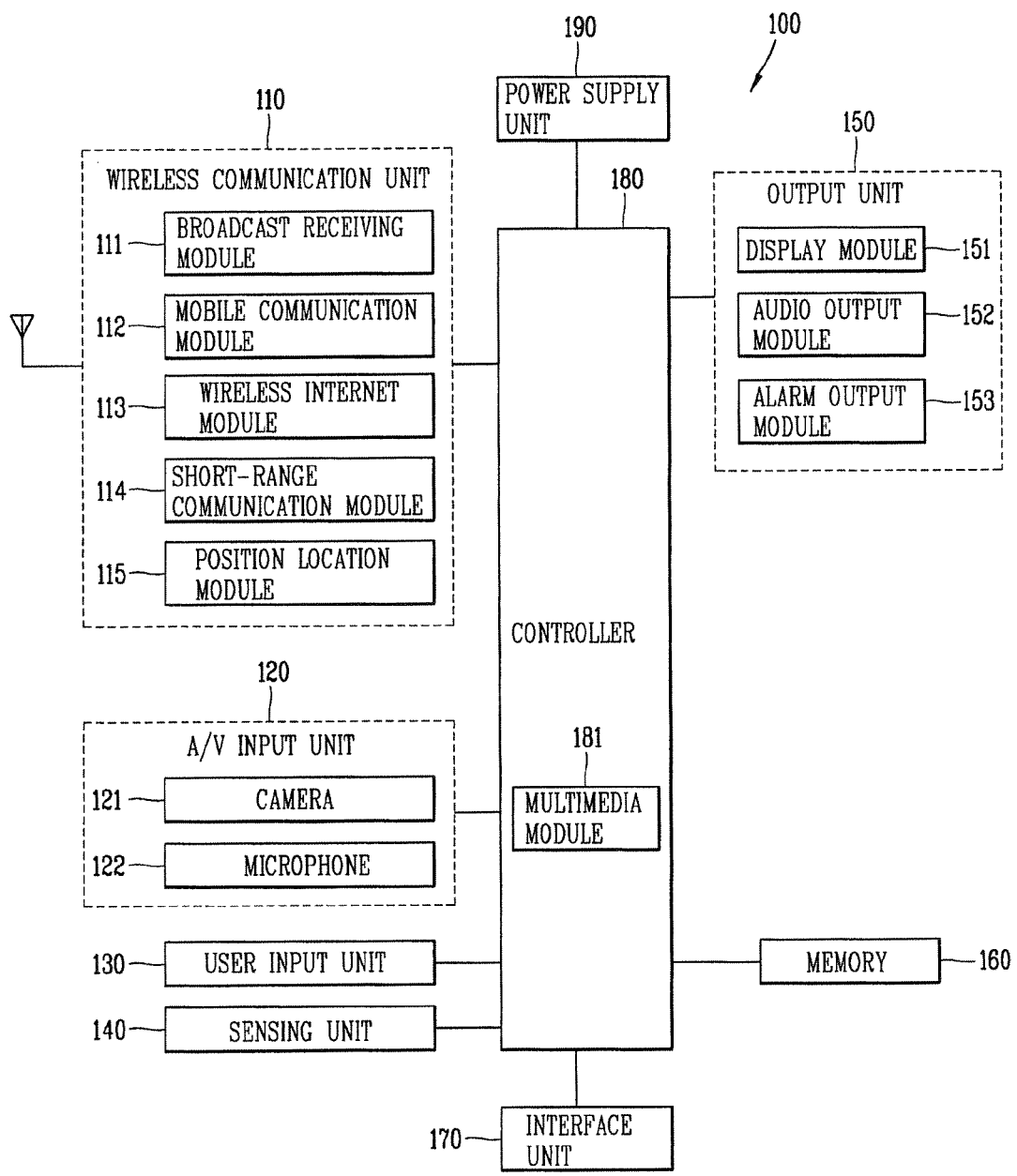
FIG. 1 is a schematic block diagram of a portable terminal according to one embodiment of the present invention.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numerals will be used throughout the drawings to refer to the same or similar parts.

FIG. 1 is a schematic block diagram of a portable terminal according to one embodiment of the present invention.

The portable terminal may be implemented in various forms. Examples of such terminals include mobile phones, user equipment, smart phones, notebook computers, digital broadcast receiver terminals, personal digital assistants (PDA), portable multimedia players (PMP) and mobile navigation units.

Referring to FIG. 1, the portable terminal 100 may include a wireless communication unit 110, an A/V (Audio/Video) input unit 120, a user input unit (or manipulation unit) 130, a sensing unit 140, an output unit 150, a memory 160, an interface unit 170, a controller 180, and a power supply unit 190, and the like. FIG. 1 shows the portable terminal 100 having various components, but it is to be understood that implementing all of the illustrated components is not a requirement. A greater or fewer number of components may alternatively be implemented.

Hereinafter, the components of the portable terminal will be described in more detail.

The wireless communication unit 110 typically includes one or more components allowing radio (wireless) communication between the portable terminal 100 and a wireless communication system or a network within which the portable terminal is located. For instance, the wireless communication unit 110 may include a broadcast receiver module 111, a mobile communication module 112, a wireless Internet module 113, a short-range communication module 114, a position-location module 115, and the like.

The broadcast receiver module 111 receives a broadcast signal and/or broadcast associated information from an external broadcast managing server via a broadcast channel. The broadcast channel may include a satellite channel and a terrestrial channel. The broadcast managing server may refer to a server that generates and transmits a broadcast signal and/or broadcast associated information or a server that receives a previously generated broadcast signal and/or broadcast associated information and transmits the same to a terminal. Examples of the broadcast associated information may include information regarding a broadcast channel, a broadcast program, a broadcast service provider, etc. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information may be provided also via a mobile communication network and, in this case, the mobile communication module 112 may receive the broadcast associated information.

The broadcast associated information may exist in various forms. For example, it may exist in the form of an electronic program guide (EPG) of digital multimedia broadcasting (DMB), an electronic service guide (ESG) of digital video broadcast-handheld (DVB-H), and the like.

The broadcast receiver module 111 may be configured to receive broadcast signals using various types of broadcast systems. In particular, the broadcast receiver module 111 may receive a digital broadcast signal using a digital broadcast system, such as Digital Multimedia Broadcasting-Terrestrial (DMB-T), Digital Multimedia Broadcasting-Satellite (DMB-S), Digital Video Broadcast-Handheld (DVB-H), the data broadcasting system known as media forward link only (MediaFLO®), Integrated Services Digital Broadcast-Terrestrial (ISDB-T), and the like. The broadcast receiver module 111 is configured to be suitable for every broadcast system that provides a broadcast signal as well as the above-mentioned digital broadcast systems.

A broadcast signal and/or broadcast-associated information received via the broadcast receiver module 111 may be stored in the memory 160.

The mobile communication module 112 transmits/receives radio signals to/from at least one of a base station, an external terminal and a server in a mobile communication network. Such radio signals may include a voice call signal, a video call signal or various types of data according to text/multimedia message transmission/reception.

The wireless Internet module 113 supports Internet access for the mobile terminal. This module 113 may be internally or externally coupled to the terminal.

The short-range communication module 114 refers to a module for supporting short-range communications. Some examples of short-range communication technology include Bluetooth™, Radio Frequency Identification (RFID), Infrared Data Association (IrDA), Ultra-WideBand (UWB), ZigBee™, and the like.

The position-location module 115 identifies or otherwise obtains the location of the portable terminal. If desired, this module may be implemented using Global Positioning System (GPS) components that receive location information from a plurality of artificial satellites. Here, the location information may include coordinate information represented by the latitude and longitude. For instance, the GPS module may accurately calculate a current location of the terminal by trigonometric measurement that measures accurate time and distance from three or more satellites and uses 3 different distance values. The GPS module may use a method that obtains time and distance information from 3 satellites and corrects an error with one satellite. In particular, the GPS module may obtain the location of the latitude, longitude and altitude from the location information received from the satellites, as well as accurate time information along with 3-dimensional velocity (speed) information.

The A/V input unit 120 is configured to input an audio or video signal. The A/V input unit 120 may include a camera 121 and a microphone 122. The camera 121 processes image frames of still pictures or videos obtained by an image capture device in a video call mode or an image-capturing mode. The processed image frames may be displayed on a display module 151 of the output unit 150.

The image frames processed by the camera 121 may be stored in the memory 160 or transmitted via the wireless communication unit 110. Two or more cameras 121 may be provided according to the configuration of the mobile terminal.

The microphone 122 may receive an external analog audio signal (audible sound) via a microphone (or the like) in a phone call mode, a recording mode, a voice recognition mode, etc., and process it into digital data. The processed audio (voice) data may be converted for output into a format transmittable to a mobile communication base station via the mobile communication module 112 in case of the phone call mode. The microphone 122 may include various types of noise canceling (or suppression) algorithms to cancel (or suppress) noise generated in the course of receiving and transmitting audio signals.

The user input unit 130 may generate key input data inputted by a user to control various operations of the mobile terminal. The user input unit 130 may include a keypad, a dome switch, a touch pad (e.g., a touch sensitive member that detects changes in resistance, pressure, capacitance, etc.), a jog wheel, a jog switch, and the like. In particular, when a touch pad is overlaid on the display module 151 in a layered manner, it may be referred to as a touch screen.

The sensing unit 140 detects a current status (or state) of the portable terminal 100 such as an opened/closed state of the portable terminal 100, a location of the portable terminal 100, a presence or absence of user contact with the portable terminal 100, etc., and generates commands or signals for controlling the operation of the portable terminal 100. For example, when the portable terminal 100 is a slide type portable phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 serves as an interface with at least one external device connected with the portable terminal 100. For example, the external devices may include wired/wireless headset ports, external power charger ports, wired/wireless data ports, memory card ports, ports for coupling equipment having an identity module, audio input/output (I/O) ports, video I/O ports, earphone ports, among others.

Here, the identity module refers to a chip which stores a variety of information to authenticate use authority of the portable terminal 100, and may include User Identity Module (UIM) cards, Subscriber Identity Module (SIM) cards, Universal Subscriber Identity Module (USIM) cards, and the like. In addition, the equipment having the identity module (hereinafter, referred to as the 'identity device') may be implemented in the form of a smart card. Accordingly, the identity device can be connected to the terminal 100 via the port. The interface unit 170 may be used to receive inputs (e.g., data, information, power, etc.) from an external device and transfer the received inputs to one or more elements within the portable terminal 100 or may be used to transfer data from the portable terminal to an external device.

The output unit 150 is configured to provide outputs in a visual, audible, and/or tactile manner (e.g., audio signal, video signal, alarm signal, etc.). The output unit 150 may include the display module 151, an audio output module 152, an alarm output module 153, and the like.

The display module 151 may output information processed in the portable terminal 100. For example, when the portable terminal 100 is in the phone call mode, the display module 151 may display a User Interface (UI) or a Graphic User Interface (GUI) associated with a call or other communication on a screen display thereof. When the portable terminal 100 is in the video call mode or the image capturing mode, the display module 151 may display a captured and/or received image, a UI, a GUI, and the like on its screen display.

Meanwhile, when the display module 151 and the touch pad are overlaid in a layered manner to form a touch screen, the display module 151 may function as both an input device and an output device. The display module 151 may include at least one of a Liquid Crystal Display (LCD) panel, a Thin Film Transistor-LCD (TFT-LCD) panel, an Organic Light Emitting Diode (OLED) display, a flexible display screen, a three-dimensional (3D) display screen, or the like. The portable terminal 100 may include two or more display modules (or other display means) 151 according to its desired implementation. For example, the portable terminal 100 may include an external display unit (not shown) and an internal display unit (not shown).

The audio output module 152 may output audio data received from the wireless communication unit 110 or stored in the memory 160 in a call signal reception mode, a call mode, a recording mode, a voice recognition mode, a broadcast reception mode, and the like. Also, the audio output module 152 may provide audible outputs related to a particular function (e.g., a call signal reception sound, a message reception sound, etc.) performed by the portable terminal 100. The audio output module 152 may include a speaker, a buzzer, or the like.

The alarm output module 153 may provide outputs to inform about the occurrence of an event of the portable terminal 100. Typical events may include a call signal reception, a message reception, a key signal input, and the like. In addition to audio or video outputs, the alarm output module 153 may provide outputs in a different manner to inform about the occurrence of an event. For example, the alarm output module 153 may provide outputs in the form of vibrations (or other tactile means). When a call signal, a message, or some other incoming communication is received, the alarm output module 153 may provide tactile outputs (i.e., vibrations) to inform the user. By providing tactile outputs, the user can recognize the occurrence of various events. Outputs informing about the occurrence of an event may be also provided via the display module 151 or the audio output module 152.

The memory 160 may store software programs or the like used for the processing and controlling performed by the controller 180, or may temporarily store inputted/outputted data (e.g., a phonebook, messages, still images, video, etc.).

The memory 160 may include at least one type of storage medium including a flash memory type, a hard disk type, a multimedia card micro type, a card-type memory (e.g., SD or XD memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM) magnetic memory, a magnetic disk, an optical disk, and the like. Also, the portable terminal 100 may cooperate with a web storage device on the Internet that remotely performs the storage function of the memory 160.

The controller 180 typically controls the general operations of the portable terminal. For example, the controller 180 performs controlling and processing associated with voice calls, data communications, video calls, and the like. In addition, the controller 180 may include a multimedia module 181 for reproducing multimedia data. The multimedia module 181 may be implemented integrally within the controller 180 or by software executed therein, or may be configured separately from the controller 180.

The power supply unit 190 receives external or internal power and supplies power required for the operations of the respective elements under the control of the controller 180.

Various functionalities described herein may be implemented in a computer-readable medium using, for example, computer software, hardware, or any combination thereof.

For a hardware implementation, the functionalities described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, the controller 180 may implement such functionalities.

For a software implementation, the functionalities such as operation procedures or functions may be implemented together with separate software modules that allow performing of at least one function or operation. Software codes can be implemented by a software application written in any suitable programming language. The software codes may be stored in the memory 160 and executed by the controller 180.

So far, the portable terminal has been described from the perspective of its functions. Hereinafter, external elements of the portable terminal will be described from the perspective of their functions with reference to FIGS. 2 and 3. The portable terminal may be implemented in a variety of different configurations. Examples of such configurations include a folder-type, a bar-type, a swing-type, a slide type and combinations thereof. For clarity, further description will primarily relate to a slide-type portable terminal. However, such teachings apply equally to other types of portable terminals.

Figure 2:
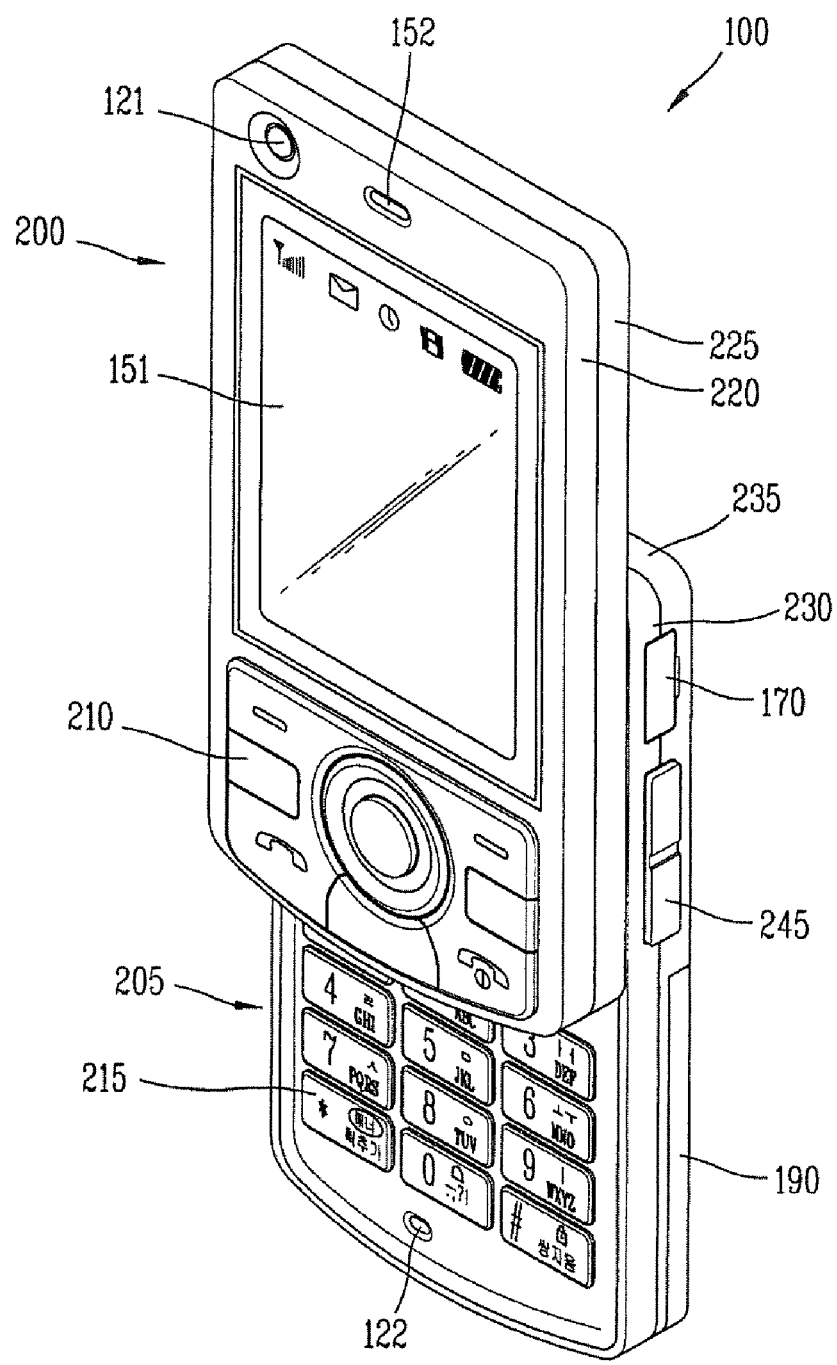
FIG. 2 is a front perspective view showing an exemplary portable terminal according to one embodiment of the present invention.

FIG. 2 is a front perspective view of a portable terminal according to the present invention.

The slide-type portable terminal according to the present invention includes a first body 200 and a second body 205 disposed to be slidably movable along at least one direction relative to one another. And, in case of the folder-type portable terminal, the portable terminal according to the present invention may include a first body and a second body configured to have at least one side thereof to be folded or unfolded by the first body.

A state in which the first body 200 is disposed to overlap with or overlie the second body 205 may be called a "closed configuration," and as shown in the drawing, a state in which the first body 200 and second body 205 are so disposed relative one another as to expose at least a portion of the second body 205 may be called an "opened configuration." In the closed configuration, the portable terminal mainly operates in a standby mode (idle mode), and the standby mode may be released according to a user manipulation. The portable terminal operates mainly in the calling mode or the like in the opened configuration, and it can be changed to the standby mode with the lapse of a certain time period or a user manipulation.

The case (a casing, a housing, a cover, etc.) constituting the external appearance of the first body 200 is formed by a first front case 220 and a first rear case 225. Various electronic components are installed in a space between the first front case 220 and the first rear case 225. One or more intermediate cases may be additionally disposed between the first front case 220 and the first rear case 225.

The cases may be formed by injection-molding a synthetic resin or may be made of a metallic material such as stainless steel (STS) or titanium (Ti), and the like.

The display module 151, an audio output module 152, a camera module 121 or a first user input unit 210 may be located on the first body 200, specifically, on the first front case 220 of the first body 200.

The display module 151 may include an LCD (Liquid Crystal Display), an OLED (Organic Light Emitting Diode) display, a transparent OLED, etc. that visually displays information.

A touch pad may be overlaid in a layered manner on the screen of the display module 151 to allow the display module 151 to function as a touch screen to enable the inputting of information by a user's touch.

The audio output module 152 may be implemented in the form of a speaker.

The camera module 121 may be implemented to be suitable for capturing images or video with respect to the user and so on.

Similar to the first body 200, the case constituting the external appearance of the second body 205 is formed by a second front case 230 and a second rear case 235.

A second user input unit 215 may be disposed on a front face of the second body 205, specifically, on the second front case 230. A third user input unit 245, the microphone 122, and the interface unit 170 may be disposed on at least one of the second front case 230 and the second rear case 235.

The first to third user input units 210, 215 and 245 may be generally referred to as the manipulation unit 130, and various techniques can be employed for implementing the manipulation unit so long as they can be operated by a user in a tactile manner.

For example, the user input units can be implemented with a dome switch or touch pad that can receive user commands or information according to a user's pressing, pushing or touching, or implemented in the form of a wheel that rotates a key, a jog element, a joystick, or the like.

In terms of their functions, the first user input unit 210 is used for inputting commands such as start, end, scroll or the like, and the second user input unit 215 is used for inputting numbers, characters, symbols, or the like.

Also, the third user input unit 245 may operate as a hot key for activating a particular function within the portable terminal.

The microphone 122 may be implemented in a form suitable to transduce the voice of a user, other sounds, or the like.

The interface unit 170 may be used as a link (passage or path) through which the portable terminal can exchange data or the like with an external device. For example, the interface unit 170 may be implemented as at least one of a connection port for connecting an earphone to the portable terminal via a wired (fixed) or wireless means, a port for short-range communications (e.g., an Infrared Data Association (IrDA) port, a Bluetooth™ port, a wireless LAN port, etc.), power supply ports for providing power to the portable terminal, or the like.

The interface unit 170 may be configured using a card socket (e.g., for coupling to an external card including a subscriber identity module (SIM) card, a user identity module (UIM) card, and a memory card for information storage.

The power supply unit 190 for supplying power to the portable terminal is located at a side portion of the second rear case 235.

The power supply unit 190 may be, for example, a rechargeable battery that can be detached.

Figure 3:
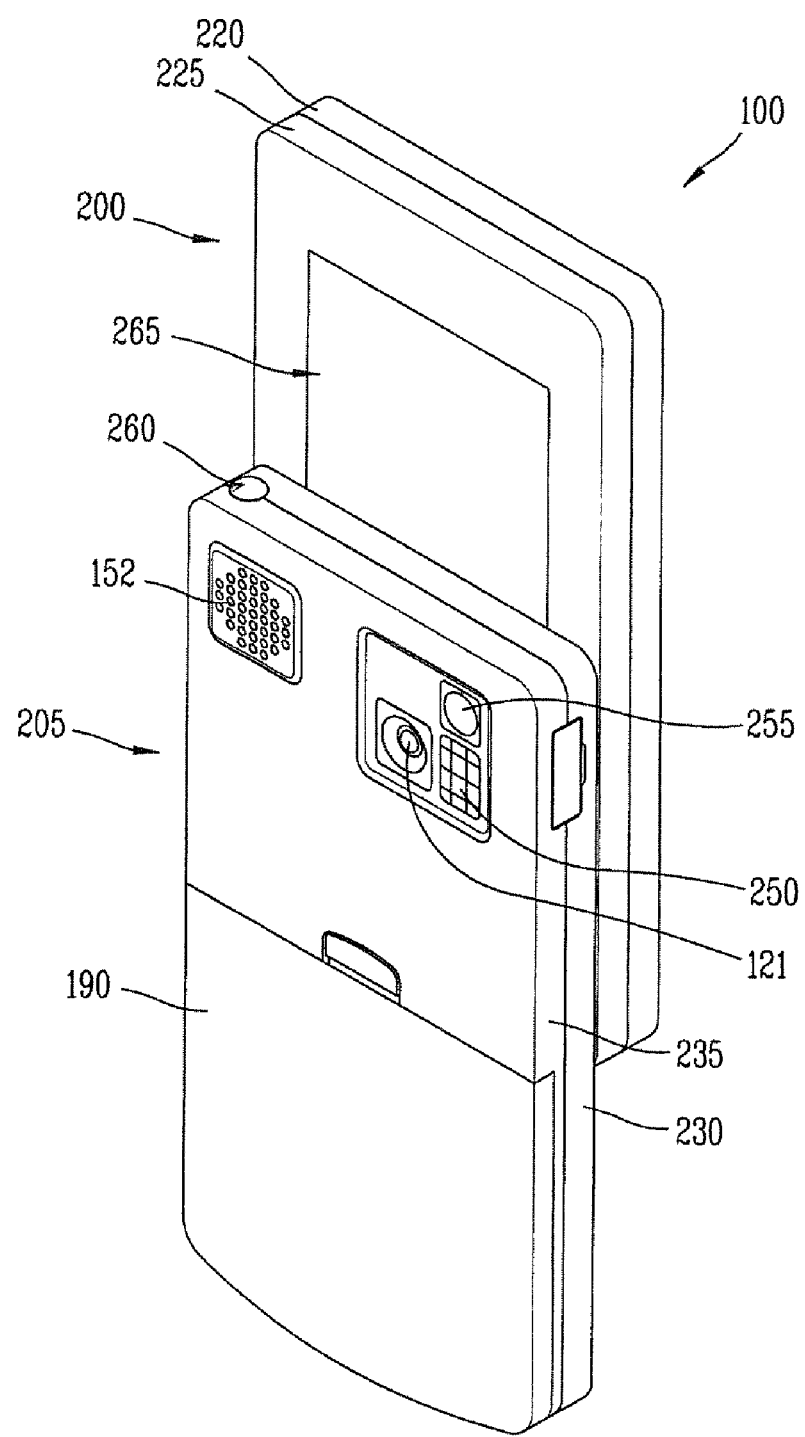
FIG. 3 is a rear view showing the portable terminal according to one embodiment of the present invention.

FIG. 3 is a rear view showing the portable terminal in FIG. 2.

Referring to FIG. 3, a camera module 121 may additionally be disposed on a rear surface of the second rear case 235 of the second body 205. The camera module 121 of the second body 205 may have an image capture direction which is substantially the opposite to that of the camera module 121 of the first body 200, and may support a different resolution, image size, or number of pixels as compared to the camera module 121 of the first body 200.

For instance, the camera module 121 of the first body 200 may operate with a relatively lower resolution to capture images of a user's face and transmit the same to the other party during video call communication or the like, while the camera module 121 of the second body 205 may operate with a relatively higher resolution to capture images of general subjects with high picture quality not for immediately being transmitted but for later use or for communicating to others.

A flash lamp 250 and a mirror 255 may be additionally disposed adjacent to the camera module 121 of the second body 205. When an image of a subject is to be captured with the camera module 121 of the second body 205, the flash lamp 250 illuminates the subject. The mirror 255 allows a user to see himself when they want to capture their own image (self-image capture) by using the camera module 121 of the second body 205.

The second rear case 235 may further include an audio output module 152.

The audio output module 152 of the second body 205 may implement a stereophonic sound function in conjunction with the audio output module 152 of the first body 200 and may be also used for sending and receiving audio calls in a speaker phone mode.

A broadcast signal receiving antenna 260 may be disposed at one side or region of the second rear case 235, in addition to an antenna that supports mobile communications. The antenna 260 can be configured to be retractable from the second body 205.

One part of a slide module 265 that slidably combines the first body 200 and the second body 205 may be disposed on the first rear case 225 of the first body 200.

The other part of the slide module 265 may be disposed on the second front case 230 of the second body 205, which may not be exposed as shown in the drawing.

In the above description, the camera module 121 and so on is disposed on the second body 205, but such a described configuration is not meant to be limiting.

For instance, one or more of the elements (e.g., 260, 121 and 250 and 152), which are disposed on the second rear case 235 in the above description, may be mounted on the first body 200, mainly, on the first rear case 225. In this case, those elements disposed on the first rear case 225 can be protected (or covered) by the second body 205 in the closed configuration. In addition, even if the camera module 121 of the second body is not provided, the camera module 121 of the first body may be configured to rotate (or otherwise be moved) to thus allow image capturing in various directions.

The portable terminal 100 as shown in FIGS. 1 through 3 may be configured to operate within a communication system which transmits data via frames or packets, including both wireless and wired communication systems, and satellite-based communication systems.

Hereinafter, referring to FIG. 4, description of the communication system in which the portable terminal can be operated according to the present invention will be given in detail.

Such communication systems utilize different air interfaces and/or physical layers. Examples of such air interfaces utilized by the communication systems include example, Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, and the Global System for Mobile communications (GSM). By way of non-limiting example only, further description will relate to a CDMA communication system, but such teachings apply equally to other system types.

Figure 4:
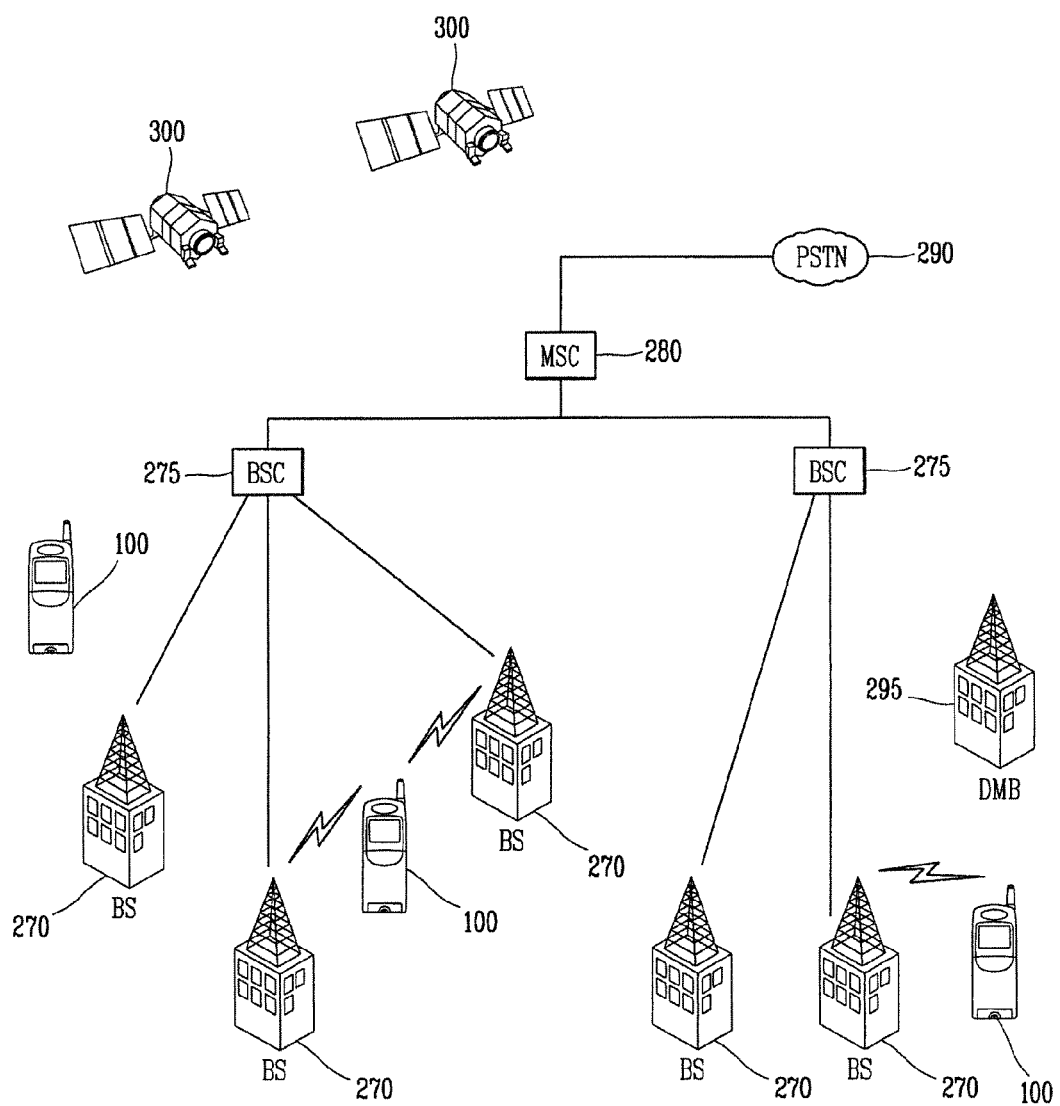
FIG. 4 is a block diagram of a radio (wireless) communication system in which a portable terminal can be operated according to one embodiment of the present invention.

Referring now to FIG. 4, a CDMA wireless communication system is shown having a plurality of portable terminals 100, a plurality of base stations 270, Base Station Controllers (BSCs) 275, and a Mobile Switching Center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with at least one of several known interfaces including, for example, E1/T1, ATM, IP, PPP, Frame Relay, HDSL, ADSL, or xDSL. It is to be understood that the system as shown in FIG. 4 may include a plurality of BSCs 275.

Each base station 270 may include one or more sectors, each sector having an omni-directional antenna or an antenna pointed in a particular direction radially away from the base station 270. Alternatively, each sector may include two or more antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

As shown in FIG. 4, a Broadcasting Transmitter (BT) 295 is shown broadcasting to portable terminals 100 operating within the system. The broadcast receiver module 111 as shown in FIG. 1 is typically configured to receive broadcast signals transmitted by the BT 295.

In addition, FIG. 4 depicts several Global Positioning System (GPS) satellites 300. Such satellites facilitate locating the position of some or all of the portable terminals 100. Two satellites are depicted, but it is understood that useful positioning information may be obtained with greater or fewer satellites. The GPS module 115 (FIG. 1) is typically configured to cooperate with the satellites 300 to obtain desired position information. It is to be understood that other types of position detection technology, (i.e., location technology that may be used in addition to or instead of GPS location technology) may alternatively be implemented. If desired, at least one of GPS satellites 300 may alternatively or additionally be configured to provide satellite DMB transmissions.

During typical operation of the wireless communication system, the Base Stations 270 receive sets of reverse-link signals from various portable terminals 100. The portable terminals 100 are engaging in calls, messaging, and other communications. Each reverse-link signal received by a given base station 270 is processed within that base station. The resulting data is forwarded to an associated BSC 275. The BSC 275 provides call resource allocation and mobility management functionality including the orchestration of soft handoffs between base stations 270. The BSCs 275 also route the received data to the MSC 280, which provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the portable terminals 100.

Description of the method for setting a variety of camera functions through a touch input and automatically performing an image capture operation in the above-configured portable terminal will be given in detail.

As shown in FIG. 1, the display module 151 according to one embodiment of the present invention is configured to display information processed in the portable terminal under the control of the controller 180. For example, when the portable terminal is in the phone call mode, the display module 151 may display a User Interface (UI) or a Graphic User Interface (GUI) associated with a call or other communication on a screen display thereof. When the portable terminal is in the video call mode or the image capturing mode, the display module 151 may display a preview image of an object to be captured by the camera 121 and then displays an image captured by the camera 121, a UI, a GUI, and the like on its screen display.

Also, the audio output module 152 may provide audible outputs related to a particular function (e.g., a call signal reception sound, a message reception sound, etc.) performed by the portable terminal 100, as well as a variety of sound effects related to image capture of the camera 121 according to the present invention.

The memory 160 may store software programs or the like used for the general operations of the portable terminal, and the processing and controlling performed by the controller 180, or may temporarily store inputted/outputted data (e.g., a phonebook, messages, captured still images, video, etc.). In addition, the memory 160 may store a software program used for controlling a touch sensing based image capture operation according to the present invention.

Further, the controller 180 according to one embodiment of the present invention as shown in FIG. 1 may control overall image capture operations of the portable terminal by recognizing the touch input as a certain signal input. That is, the controller 180 senses the touch input by a user's touch on the touch screen, sets an image capture function based on the sensed touch input, and then controls the camera according to the set capture function, thereby automatically performing the image capture operation. Also, the controller 180 controls the display module 151 so as to display a variety of information necessary to perform the image capture operation. Preferably, the image capture function may include at least one of a focus area, exposure, illumination, lightness, zoom-in/zoom-out, color change and a continuous image capture operation.

Hereinafter, the touch sensing based image capture method in the above-described portable terminal according to the present invention will be described in detail.

In the configuration of the portable terminal as shown in FIG. 1, the touch sensing based image capture is mainly performed by the A/V input unit 120, the display module 151, the memory 160, the audio output module 152 and the controller 180. Additionally, the wireless communication unit 110 may be used if a captured image is to be processed and transmitted. In addition, the user input unit 130 and the like may also be used according to the modification of the examples. Accordingly, the A/V input unit 120, the display module 151, the memory 160, the audio output module 152 and the controller 180 may be generally referred to as a "touch sensing based image capture device."

Figure 5:
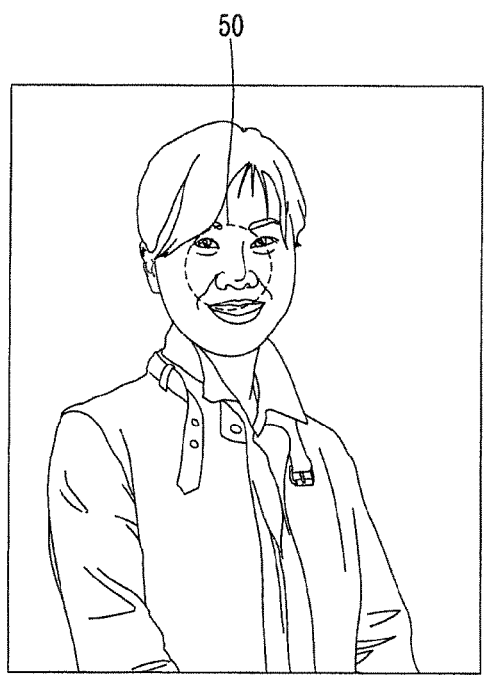
FIG. 5 is a diagram showing an example of selecting a focus by using a touch on a preview screen display according to the present invention.

First, in order to implement the touch sensing based image capture according to the present invention, the types and functions of a touch will be defined as below:

1. Touch types
    a short touch;
    a long touch;
    a double-touch;
    a multi-position touch; and
    a touch & drag In the present invention, the short and long touches are generally configured to perform the image capture operation. As shown in FIG. 5, a focus is generated on all touched positions after being touched. Here, the time for the long touch would be enough so long as it takes as much as a time taken to press a key to switch a voice mode into a manner mode in the portable terminal.

Differences of each touch are described as follows. If the long touch is performed, a separate menu window is displayed, without immediately displaying a focus on the touched position and automatically performing the image capture operation, such that the user enables to select object recognition (e.g., face recognition), area recognition, depth of field adjustment, a focus shape and the like.

Figure 6:
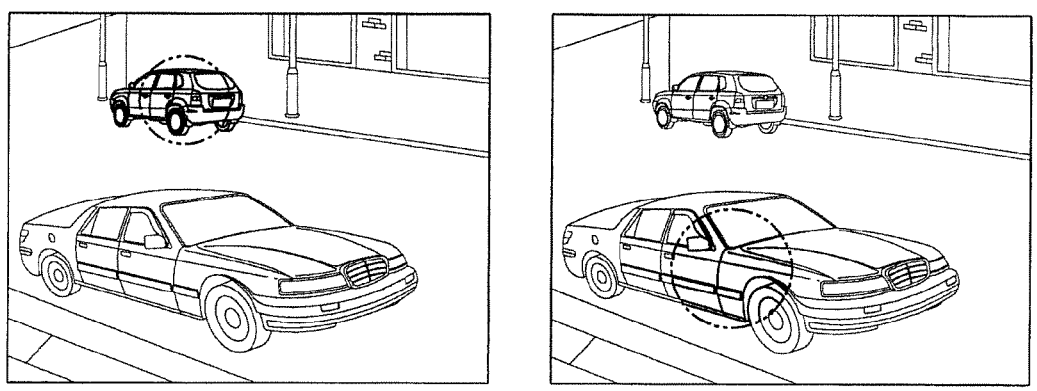
FIG. 6 is a diagram showing an example of capturing an object by adjusting a depth of field according to the present invention.

The object recognition refers to correctly focusing an object of a touched position, i.e., on a face by performing an Auto Focus (AF). The area recognition refers to focusing area coverage of the touched position (e.g., a circle or rectangle) by performing the AF. In addition, the depth of field as shown in FIG. 6 refers to applying a depth-of-field effect to the object or area of the touched position, such that a background of a main object to be captured appears to be blurred while the object to be captured appears sharp (clear), or the background of the object appears to be sharp. For instance, if flowers, insects, models or the like are to be captured, the background thereof should be captured blurred, thus to make the object appear sharp.

The Auto Focus (AF) refers to a function which the camera 121 automatically focuses on an object to be captured, and enables the user to more easily and conveniently obtain a focus than a Manual Focus (MF), requiring the user to check the object to be captured via a view finder or a Liquid Crystal Display (LCD) monitor and to manually adjust the focus.

Figure 7:
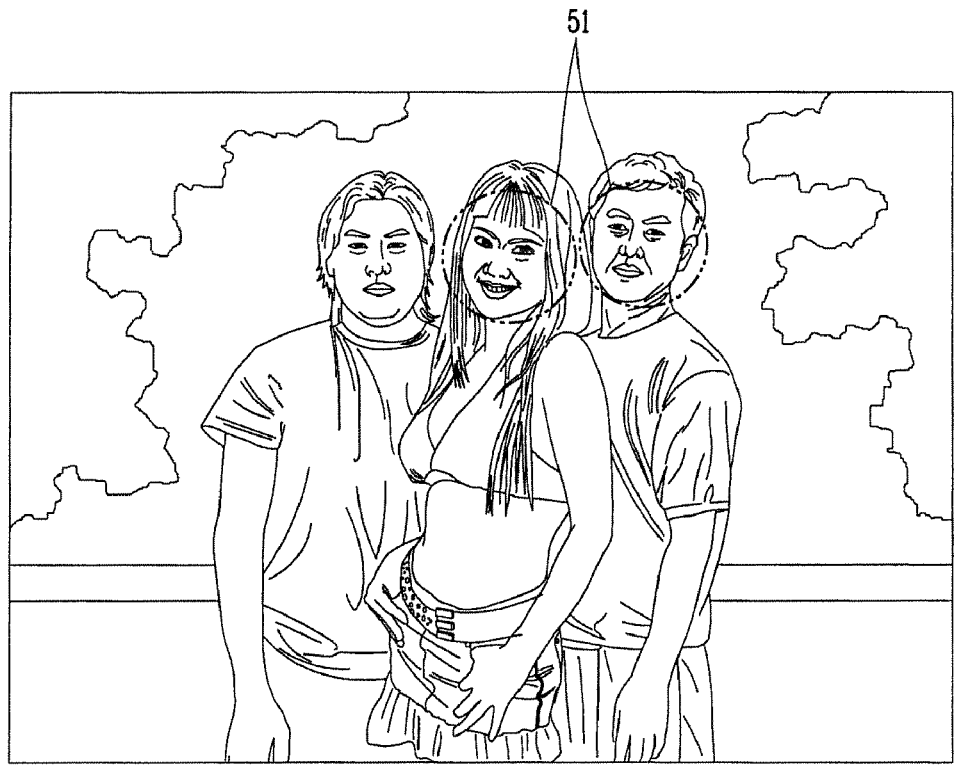
FIG. 7 is a diagram showing an example of selecting a multi-position focus by using a touch on the preview screen display according to the present invention.

The double-touch is a touch used to remove the focus generated by the short and long touches. As shown in FIG. 7, the multi-position touch refers to setting one or more focus areas 51 by allowing the user to touch several positions of the object to be captured. The multi-position touch on the preview screen display indicates a multi-shot for continuously capturing each of the touched positions.

The touch & drag is used for setting the focus area in the form of closed curves (e.g., a circle, an ellipse, a polygon, etc.). A specific effect (e.g., using a predetermined color, flashing, etc.) may be displayed on the focus area generated by the touch & drag.

Accordingly, the present invention may set a certain image capture function based on the number of touches and time thereof, and also set the image capture function for a certain area of the preview image.

2. Functions of a touch
    generating/deleting a focus;
    setting a focus area; and
    capture (general, continuous)

As described above, the user's touch on the preview screen display of the touch screen is to simultaneously perform the selection of the focus area as well as the image capture operation. Performing the short, long, multi-position touches and touch & drag generates the focus. The generated focus is deleted by performing the double-touch. Here, there is a difference of generating the focus among the short, long, multi-position touches and touch & drag: the short touch displays a focus having a predetermined size and shape, while the long touch, the multi-position touch (including the long touch) and the touch & drag generate a focus according to the size and shape based on the user's input.

In addition, in the present invention, the general capture and the continuous capture are distinguished from each other by the number of touches. That is, one-time touch, such as the short touch and the long touch, refers to the general image capture. Two or more touches, such as the multi-position touch, refer to the continuous image capture that continuously captures a touched position.

Hereinafter, description of the touch sensing based image capture method according to the present invention will be given in more detail based on the types and functions of the touch.

Figure 8:
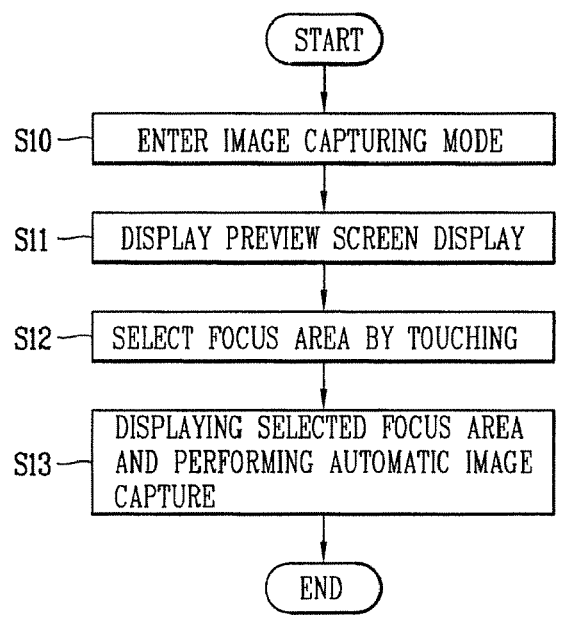
FIG. 8 is a flowchart showing a first exemplary touch sensing based image capture method according to one embodiment of the present invention.

FIG. 8 is a flowchart showing a first exemplary touch sensing based image capture method according to one embodiment of the present invention.

As shown in FIG. 8, the first embodiment of the present invention describes an example that the touch input is recognized as the focus area setting which can be one of the image capture functions and an image capture command. Preferably, the image capture function may include a setting, change and execution for a focus area, exposure, illumination, lightness, zoom-in/zoom-out, color change and the continuous capture (shooting).

If the user selects an image-capturing mode in the camera mode, the controller 180 performs a control of the display module 151 such that a preview image of an object to be captured, sensed by an image sensor (not shown), can be displayed on the touch screen (S10). Here, the user may perform operations required until before performing a final capture operation (e.g., perform a zoom function (zoom-in/zoom-out) by using a certain key disposed in the user input unit 130 or adjust a camera angle). In addition, the user may automatically adjust the zoom function and other required operations by the touch input, not by a key input.

Figure 9:
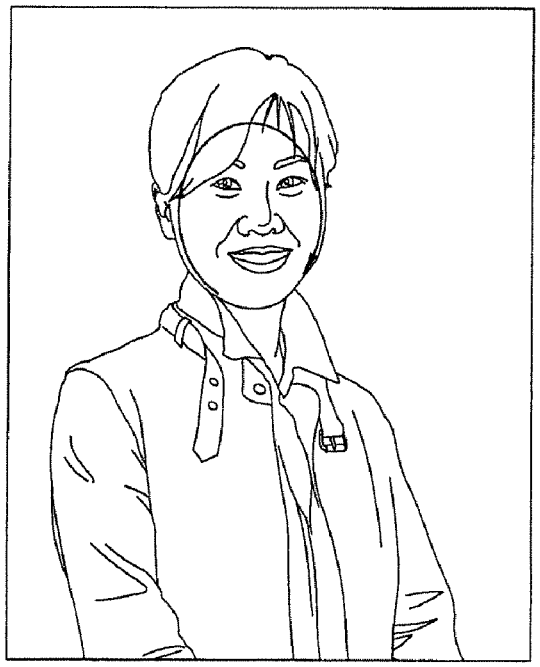
FIG. 9 is a diagram showing an example of setting a focus area by drawing a figure with a finger according to the present invention.

When the preview image is displayed, the user selects the focus area by touching a point of the touch screen with his finger, or sets the focus area by drawing a circle with his finger as shown in FIG. 9.

Accordingly, the controller 180 determines the touch type based on the user's touch input sensed by the sensing unit 140 and sets an image capture function corresponding to the determined touch input (S13), then automatically performs the image capture operation according to the set capture function, i.e., by focusing the touched position (i.e., focus area) by performing the AF function (S14). Here, the set function is displayed on the preview screen display visually or audibly.

Figure 10:
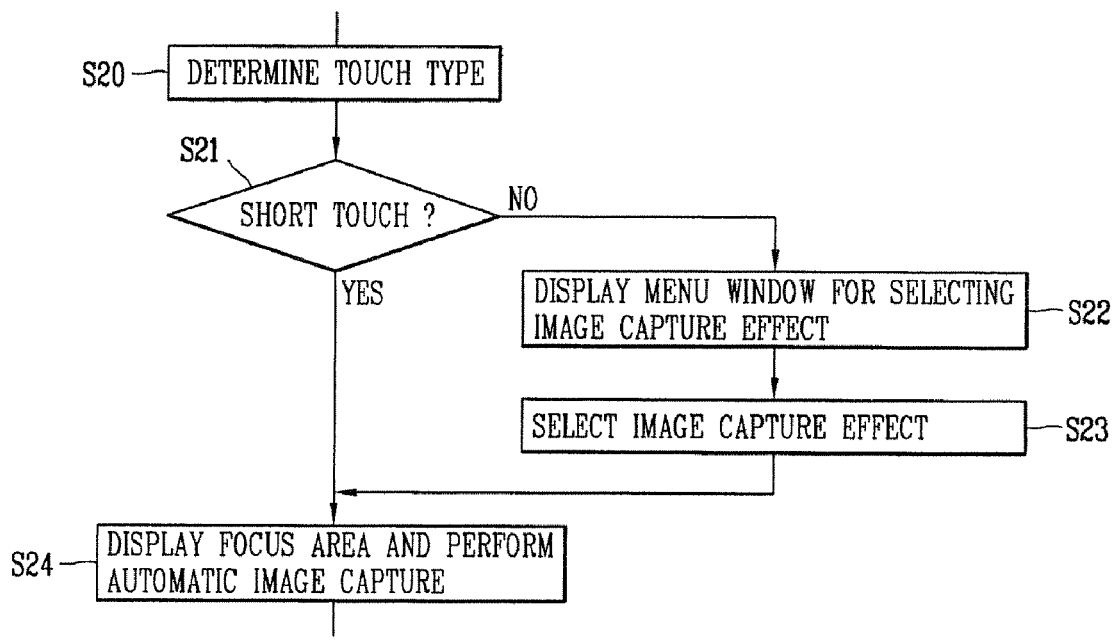
FIG. 10 is a flowchart showing an example of performing an automatic capture operation according to a touch type in the present invention.

FIG. 10 shows an example of performing the automatic image capture operation by sensing the touch input.

As shown in FIG. 10, the controller 180 may determine the type of touch by the user's input according to the sensing result of the sensing unit 140 (S20, S21), and performs the image capture operation by distinguishing the general image capture (or manual or automatic capture) and the continuous image capture according to the determined type of the touch.

If the sensed touch input is the short touch indicating the general image capture, the controller 180 performs a control of the display module 151 so as to generate a focus on the touched position, and then performs a control of the camera 121 so as to automatically perform the image capture operation (S24). Here, in a case of the short touch, the recognition technique (object or area), the depth of field adjustment, the focus shape, etc., which are set as a default setting, may be displayed or initially set from the menu by the user.

If the sensed touch input is the long touch indicating the general image capture, the controller 180 displays a separate menu window on the touch screen such that the user may select an option including the object recognition (e.g., face recognition), the area recognition, the depth of field adjustment, the focus shape, and the like (S22).

If an option desired by the user is selected from the menu window (S23), the controller 180 performs a control such that the focus with the selected shape and size is displayed on the preview screen display, and then automatically performs the image capture operation (S24). Here, an indication (color, thickness of a line, flashing) on the screen display informing that the touched object or area has been selected is displayed on the preview screen display.

However, if the sensed touch input is the multi-position touch indicating the continuous image capture, instead of the short and long touches, the controller 180 determines a touched position and continuously performs a multi-shot capture by combining the short touch and the long touch as described in FIG. 10.

In addition, when a focus is displayed on a specific position, if the specific position is touched again (double-touch), the controller 180 is configured to delete the focus displayed on the corresponding position. Further, in the state that the focus is displayed on the specific position, if the corresponding focus is dragged in the shape of a straight line, the controller 180 is configured to move the displayed focus to a direction being dragged.

The first embodiment of the present invention automatically performs the focus area setting, as one of the image capture functions, and the image capture operation by one touch on the preview screen display, thereby enabling the user to conveniently perform the image capture operation at the desired focus.

Figure 11:
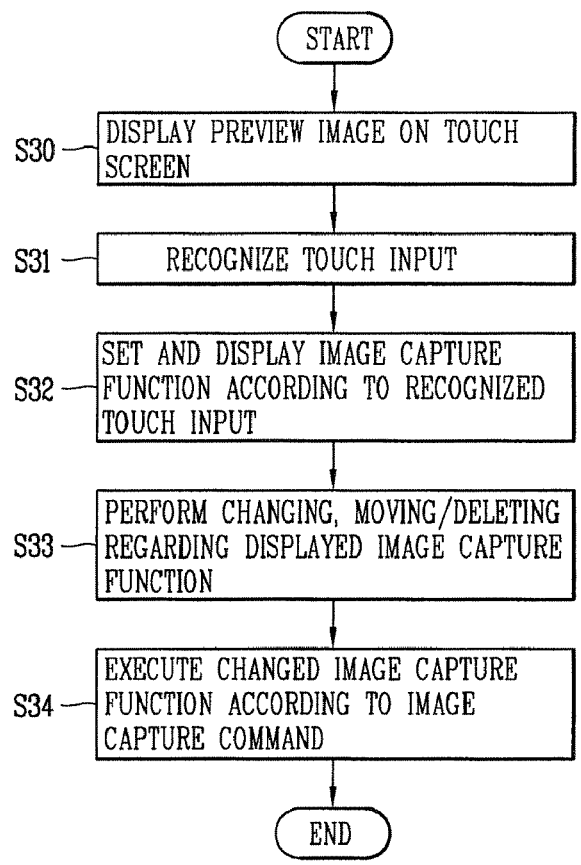
FIG. 11 is a flowchart showing a second exemplary touch sensing based image capture method according to one embodiment of the present invention.

FIG. 11 is a flowchart showing a second exemplary touch sensing based image capture method according to one embodiment of the present invention. As shown in FIG. 11, the second embodiment of the present invention shows an example of inputting a separate image capture command after selecting the focus area.

In the first embodiment of the present invention, the AF for the area set by the user is done within a short period of time during which the image capture is actually being performed after the touch input. Accordingly, in the first embodiment, various modifications (changes) in the already selected focus or other camera functions may be difficult.

Therefore, in the second embodiment, the focus area selection (or setting) and the image capture are separately inputted, thus to smoothly perform the setting/changing of the focus or other camera functions. And, the second embodiment has the same detailed operations for the focus area selection as the first embodiment.

That is, the controller 180 recognizes the type of the touch inputted by the user, sets an image capture function according to the corresponding touch input, and then displays it on the preview screen display (S30~S32). Here, if there is the long touch indicating the general image capture, the controller 180, as shown in FIG. 10, displays the separate window on the display module 151 such that the user can select the object recognition (e.g., face recognition), the area recognition, the depth of field adjustment, the focus shape and the like.

And, while the focus is displayed, the user may move the corresponding focus by using his finger (dragging) or a direction key, and delete the displayed focus by the double-touch. In addition, the user may reduce or enlarge the size of the already displayed focus as well as change its shape by holding an edge of the focus to extend (drag) (S33).

If the setting of the focus is completed by using such various methods, the user may input the image capture command by using a user touch key provided on the touch screen or a specific key provided in the user input unit 130. Accordingly, the controller 180 may control the camera based on the determined touch type (i.e., the image capture function set by the user according to the image capture command), thus to perform either the general image capture or the continuous image capture. The captured still image is stored in the memory 160 and is transmitted to the external device via the wireless communication unit 110 under the control of the controller 180.

Figure 12:
FIG. 12 is a diagram showing an indication on a screen display indicating that a touched object or area is selected according to the present invention.

In the first and second embodiments of the present invention, the controller 180, as shown in FIG. 12, is configured to display on the display module 151 an indication on the screen display (a semi-transparent color, thickness of a line, flashing) representing that the touched object or area has been selected, as well as to apply an animation effect representing that the current image is to be captured as either the general image capture (i.e., automatic capture) or the continuous image capture (i.e., multi-shot capture). For instance, when the image is captured, a sound effect may be provided. In particular, in the continuous image capture, a variety of effects such as a clicking sound or vibration may be applied to each picture.

The present invention has mainly described the preferred embodiments in which the touch sensing based automatic image capture is applied to the portable terminal. However, without being limited to this, the present invention may be applied to any devices having the touch screen.

In addition, the portable terminal in the present invention may be implemented in a variety of different configurations, such as a folder-type, a bar-type, a swing-type, a slide type, a hinge-type, etc., so long as the portable touch screen is employed.

In addition, a medium for recording a program can be implemented as a code that can be read by a computer. The medium that can be read by a computer includes all types of recording devices for storing data such as a ROM, a RAM, a CD-ROM, a magnetic tape, a floppy disk, and an optical data storing device. The medium can be also implemented as a carrier wave (e.g., a data transmission through the Internet). The computer may include the controller 180 of the portable terminal.

The portable terminal according to the present invention is not limited to the configuration and method of the above-described embodiments, but may be variously modified by selectively combining the entirety or a portion of each embodiment.

As so far described, the present invention has an effect of conveniently performing an image capture operation in a device employing a touch screen, by setting a variety of functions required for an image capture through a touch input on a preview screen of the touch screen and by actually performing the image capture operation.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of performing image capture in a portable terminal, the method comprising:
   displaying a preview image of an object to be captured on a touch screen;
   recognizing a touch input on the touch screen related to the preview image;
   identifying a type of the recognized touch input;
   displaying at least one focus area on a portion of the preview image at a position where the touch input was recognized;
   determining whether an image capture to be performed is a general image capture or a continuous image capture based on the identified type of the recognized touch input; and
   performing the general image capture or the continuous image capture based on the determination,
   wherein the touch input is recognized as a setting for the at least one focus area and as a command to perform the general image capture or the continuous image capture.

2. The method of claim 1, wherein the recognized touch input is identified as a short touch, a long touch, a multi-position touch, or a touch & drag.

3. The method of claim 2, wherein:
   the general image capture is performed when the identified type of touch input is the short touch or the long touch; and
   the continuous image capture is performed when the identified type of touch input is the multi-position touch.

4. The method of claim 2, further comprising;
   displaying a capture effect selection menu window when the identified type of touch is the long touch; and
   receiving a selection of at least one capture effect from the displayed capture effect selection menu,
   wherein the general image capture or the continuous image capture is automatically performed based upon the selection of the at least one capture effect.

5. The method of claim 4, wherein the at least one selected capture effect comprises object recognition, area recognition, depth of field adjustment or a focus shape.

6. The method of claim 1, further comprising no longer displaying the at least one focus area upon recognizing a double-touch input.

7. The method of claim 1, wherein the at least one focus area has a form of dots or closed curves.

8. The method of claim 1, further comprising moving the displayed at least one focus area upon recognizing a dragging touch input.

9. The method of claim 1, wherein displaying the at least one focus area comprises visually displaying various colors on the preview image or generating an audible output.

10. The method of claim 1, wherein the general image capture or the continuous image capture is performed automatically.

11. The method of claim 1, wherein the general image capture or the continuous image capture is performed manually.

12. A portable terminal, comprising:
   a touch screen configured for displaying a preview image of an object to be captured; and
   a controller configured for:
      recognizing a touch input on the touch screen related to the preview image;
      identifying a type of the recognized touch input;
      controlling the touch screen to display at least one focus area on a portion of the preview image at a position where the touch input was recognized;

determining whether an image capture to be performed is a general image capture or a continuous image capture based on the identified type of the recognized touch input, and performing the general image capture or the continuous image capture based on the determination, wherein the controller recognizes the touch input as a setting for the at least one focus area and as a command to perform the general image capture or the continuous image capture.

13. The terminal of claim 12, wherein the recognized touch input is identified as a short touch, a long touch, a multi-position touch, or a touch & drag.

14. The terminal of claim 13, wherein the controller is further configured for:

performing the general image capture when the identified type of touch input is the short touch or the long touch; and performing the continuous image capture when the identified type of touch input is the multi-position touch.

15. The terminal of claim 13, wherein the controller is further configured for:

controlling the touch screen to display a capture effect selection menu window when the identified type of touch is the long touch; and receiving a selection of at least one capture effect from the displayed capture effect selection menu, wherein the general image capture or the continuous image capture is automatically performed based upon the selection of the at least one capture effect.

16. The terminal of claim 15, wherein the at least one selected capture effect comprises object recognition, area recognition, depth of field adjustment or a focus shape.

17. The terminal of claim 12, wherein the controller is further configured for controlling the touch screen to no longer display the at least one focus area upon recognizing a double-touch input.

18. The terminal of claim 12, wherein the at least one focus area has a form of dots or closed curves.

19. The terminal of claim 12, wherein the controller is further configured for controlling the touch screen to move the displayed at least one focus area upon recognizing a dragging touch input.

20. The terminal of claim 12, wherein the controller is further configured for controlling the touch screen to display the at least one focus area by visually displaying various colors on the preview image or generating an audible output.

21. The terminal of claim 12, wherein the controller is further configured to perform the general image capture or the continuous image capture automatically.

22. The terminal of claim 12, wherein the controller is further configured to perform the general image capture or the continuous image capture in response to recognizing a manual input.

* * * * *